United States Patent [19]

Takagi

[11] 3,972,470
[45] Aug. 3, 1976

[54] ELECTRIC POWER SYSTEM SUPERVISORY CONTROL SYSTEM COMPRISING A/D CONVERTERS AT VARIOUS POINTS OF THE POWER SYSTEM

[75] Inventor: Toshio Takagi, Tokyo, Japan

[73] Assignee: Tokyo Denryoku Kabushiki Kaisha, Tokyo, Japan

[22] Filed: Mar. 27, 1975

[21] Appl. No.: 562,452

Related U.S. Application Data

[63] Continuation of Ser. No. 386,382, Aug. 7, 1973, abandoned.

[30] Foreign Application Priority Data

Sept. 7, 1972  Japan.............................. 47-89794

[52] U.S. Cl.............................. 235/151.21; 444/1; 307/17
[51] Int. Cl.² ....................... G06F 15/56; H02J 3/06
[58] Field of Search....................... 235/151.21, 184; 340/172.5, 347 AD; 444/1; 307/52, 17; 290/40 R

[56] References Cited
UNITED STATES PATENTS
3,552,872   1/1971   Giras et al. ........................... 415/17

OTHER PUBLICATIONS
Little Gypsy Uses Advanced Hardware; W.T. Hess, L.V. Maurin, F.A. Ritchings & W.A. Summers; *Electrical World*, Apr. 30, 1962.

Computer Starts, Runs, Stops Little Gypsy; W.T. Hess, L.V. Maurin, F.A. Ritchings & W.A. Summers; *Electrical World*, Apr. 23, 1962.

Little Gypsy Teaches Vital Lessons; W.T. Hess, L.V. Maurin, F.A. Ritchings & W.A. Summers; *Electrical World*, May 7, 1962.

Small Digital Computer Controls Large Power System; H.G. Koen Jr., W.B. Nelms & J.E. Brabston; *Electrical World*, Mar. 4, 1968.

*Primary Examiner*—Edward J. Wise
*Attorney, Agent, or Firm*—Haseltine, Lake & Waters

[57] ABSTRACT

A supervisory control system for an electric power system comprises a synchronized encoder for producing digital signals from voltage and/or current data detected by at least one of a number of detecting devices for such data coupled to the power system at various points. Inherently stationary data detected by similar detecting devices are converted into digital signals by asynchronous encoders. Responsive to such digital signals, data processing means produces address signals representative of the addresses of the detecting devices and processes the digital signals in compliance with programs for various supervisory control and with reference to the address signals to produce control signals, which are sent to circuit breakers, voltage regulators, and the like to protect the power system against troubles.

3 Claims, 17 Drawing Figures

ELECTRIC POWER SYSTEM SUPERVISORY CONTROL SYSTEM COMPRISING A/D CONVERTERS AT VARIOUS POINTS OF THE POWER SYSTEM

CROSS-RELATED APPLICATION

This application is a continuation of copending application Ser. No. 386,382 filed Aug. 7, 1973 now abandoned and claiming the priority of the application filed in Japan on Sept. 7, 1972.

BACKGROUND OF THE INVENTION

This invention relates to a supervisory control system for an electric power system.

An electric power system comprises transmission lines and electric power houses situated at discrete locations. An "electric power house" as employed herein may be a power station, a substation, a switching station, a combination of such stations, or the like and comprises "electric power apparatus" which may be a dynamo, a transformer, a circuit breaker, a line switch, a voltage regulator, a phase modifier, and/or the like, among which the first two are called herein "primary power apparatus" and the rest are called "secondary power apparatus". In some cases, loads may be substituted for an electric power house.

A supervisory control system for an electric power system comprises a plurality of detecting devices associated with the power system at various points for detecting instantaneous analog data, such as voltages and currents, and for detecting the inherently stationary data representative of the states, of the power apparatus. The supervisory control system further comprises protection and supervisory control equipment for processing the above-mentioned data to carry out protection and other supervisory control of the power system and communication equipment for transmitting the processed data between a local electric power house and adjacent electric power houses. The protection and supervisory control equipment of the conventional supervisory control system makes use of the analog data in comparing the voltage and current data with the standard voltage and current, in deriving the sums of the currents in different wires, in discriminating the phases of the voltages and currents, in calculating the effective power, and in otherwise processing the data.

As the power system becomes greater in scale more intricate in construction, defects of the conventional supervisory control system have grown more serious and notable. As will later be described in detail with reference to the accompanying drawings, such defects reside in the necessity of using high-power outputs for the detecting devices, the complicated structures of the current transformers, the inevitable error in the instantaneous current data, bulk of the cables for transmitting the detected high-power outputs to the protection and supervisory control equipment, the limited reliability of the analog data processing, the poor performance of supervisory control systems for wide areas, the meager versatility of supervisory control systems, and so forth.

SUMMARY OF THE INVENTION

It is therefore an object of the present invention to provide a compact supervisory control system for an electric power system, capable of effecting accurate and reliable supervisory control over a power system.

It is another object of this invention to provide a supervisory control system of the type described, capable of protecting, regulating, and otherwise supervising and controlling a power system with high performance as well as of recording various data of the power system and tabulating statistical data for planning and operation of electric power systems.

It is still another object of this invention to provide a supervisory control system of the type described, which is substantially devoid of the defects mentioned above.

A supervisory control system for an electric power system according to this invention comprises first detecting devices coupled to the power system at first preselected points for detecting instantaneous analog data of the power system to produce instantaneous analog signals representative of the analog data and second detecting devices coupled to the power system at second preselected points for detecting inherently stationary data of the power system to produce inherently stationary signals representative of the inherently stationary data. The supervisory control system further comprises a master oscillator for producing timing pulses and a plurality of synchronized encoders, each placed adjacent to at least one of the first detecting means devices and electrically associated therewith. The encoders substantially simultaneously sample the instantaneous analog signals in response to the instantaneous analog signal samples. Besides the synchronized encoders, the supervisory control system comprises an asynchronous encoder placed adjacent to at least one of the second detecting devices and electrically associated therewith for sampling the inherently stationary signals produced by the associated at least one second detecting device to produce sampled inherently stationary signals. In addition, the supervisory control system comprises digital data processing means responsive to the digital signals and the sampled inherently stationary signals for producing output signals for use in supervising and controlling the power system.

It may be mentioned here that digital transmission of the current data and the like is often employed in conventional supervisory control systems between the communication equipment with a view to obviating the adverse effects which would otherwise be caused on the data by noise and level fluctuation. The digital signals, however, are converted back into analog signals by the communication equipment to be used in the supervisory control equipment. In this connection, no one has ever thought of using analog-to-digital conversion of analog signals at the locations of the detecting devices. The reason for this is that the conventional supervisory control equipment operates only on an analog basis. In addition, it would have been quite unobvious that a supervisory control system according to this invention could obviate the defects exemplified above in conjunction with the conventional systems and instead provide quite unexpected and astonishing technical merit which will later be described in detail.

BRIEF DESCRIPTION OF THE DRAWINGS

FIGS. 1 (a) and (b) schematically show the circuit of a conventional supervisory control system for an electric power system, with FIG. 1(b) being located on the right side of FIG. 1(a);

DESCRIPTION OF THE PREFERRED EMBODIMENTS

Before describing a system for supervising and controlling an electric power system according to the present invention, a conventional supervisory control system will be described with reference to FIGS. 1 through 3 in order to facilitate an understanding of this invention.

Figure 1A:
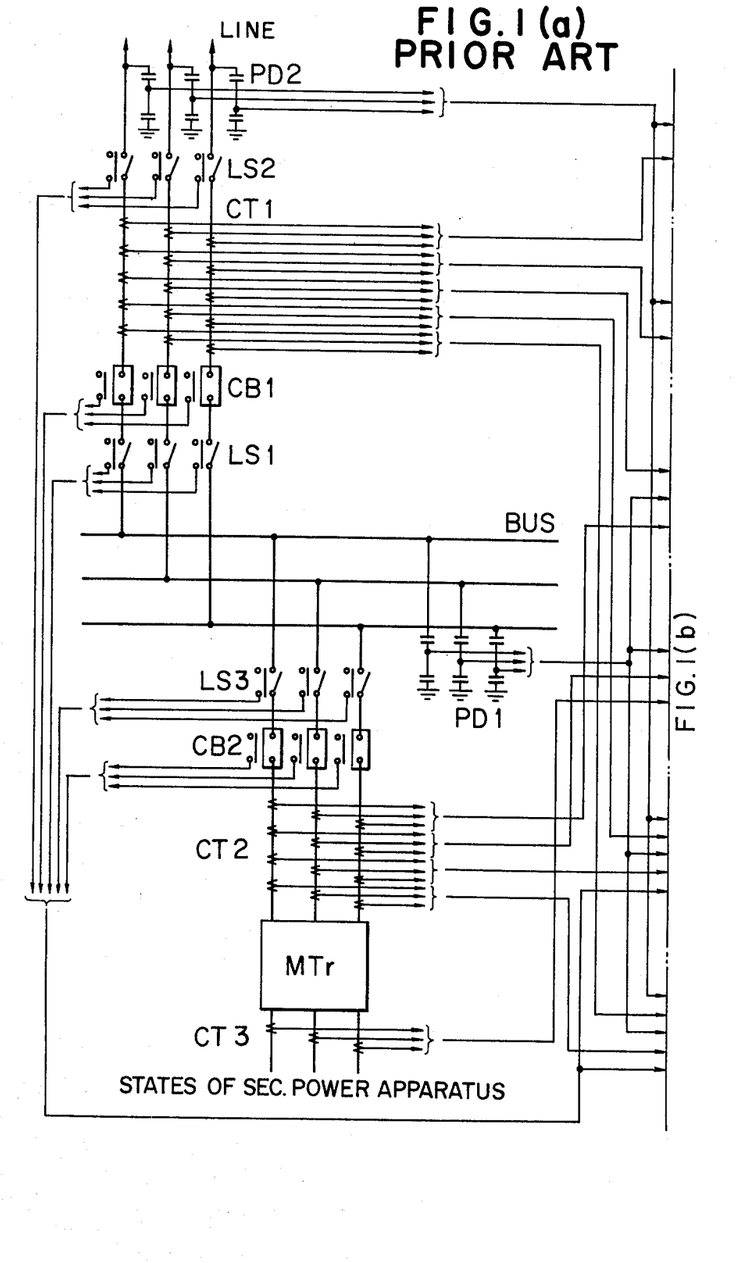
Figure 1B:
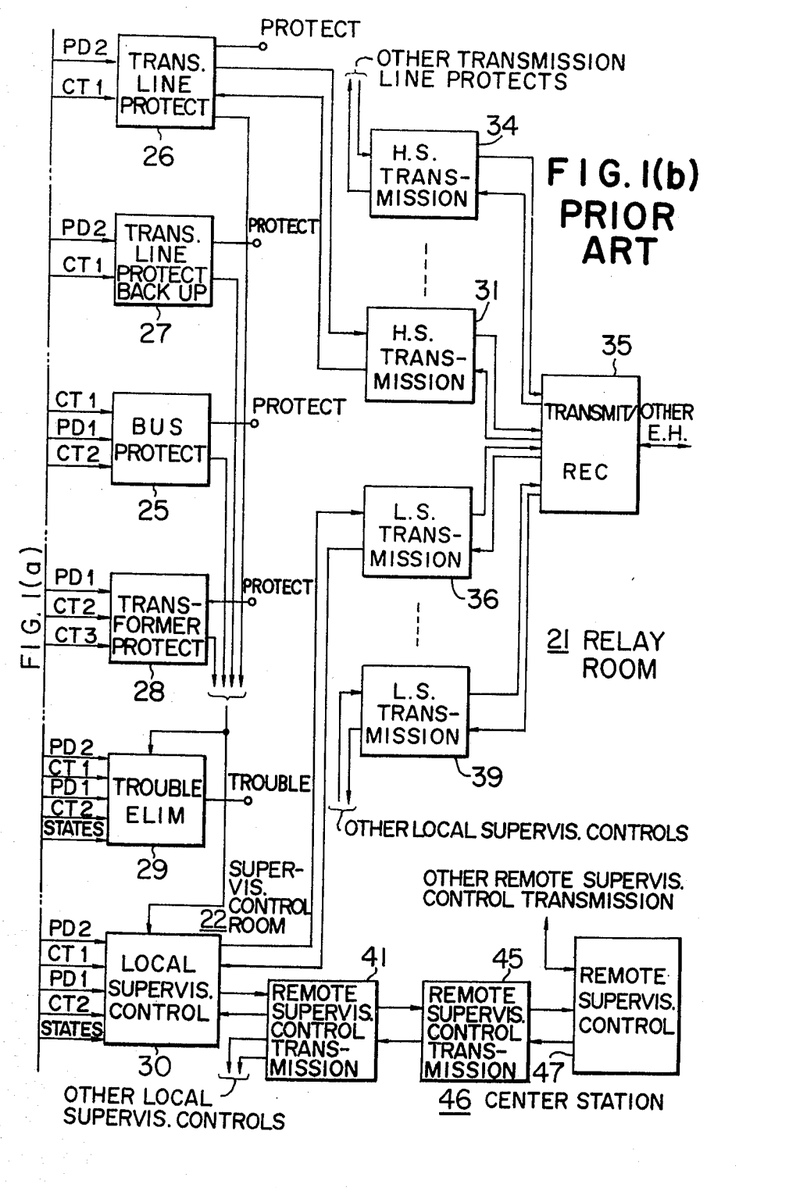

Referring to FIG. 1, a local electric power house may comprise a set of bus bars BUS, a first set of line switches LS1 of a transmission line LINE connected to the bus bars BUS, a first set of circuit breakers CB1 connected to the line switches LS1, a second set of line switches LS2 interposed between the circuit breakers CB1 and an adjacent power house (not shown), a third set of line switches LS3 connected to the bus bars BUS, a second set of circuit breakers CB2 connected to the third line switches LS3, and a main transformer MTr connected to the second circuit breakers CB2 on the high voltage side thereof and either to a dynamo (not shown) of the local house or to another adjacent power house or loads through another set of circuit breakers (not shown) on the low voltage side. A conventional supervisory control system exemplified in FIG. 1 comprises a first set of potential devices PD1 for detecting the instantaneous voltage data of the bus bars BUS, a second set of potential devices PD2 for detecting the instantaneous voltage data of the transmission line LINE, a first set of current transformers CT1 for detecting the instantaneous current data of the transmission line LINE, and a second and a third set of current transformers CT2 and CT3 for detecting the instantaneous current data on the high and low voltage sides of the transformer MTr, respectively.

Figure 2A:
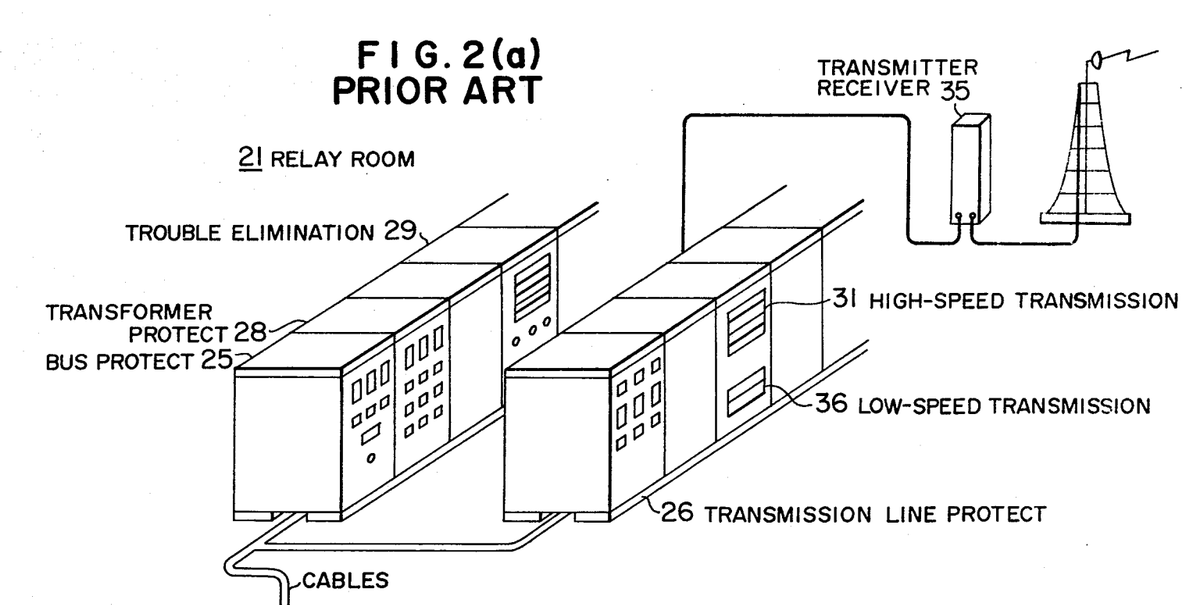
FIGS. 2(a) and (b) show a schematic perspective view of a conventional system, with FIG. 2(b) to being located at the bottom of FIG. 2(a)
Figures 2A, 2B:
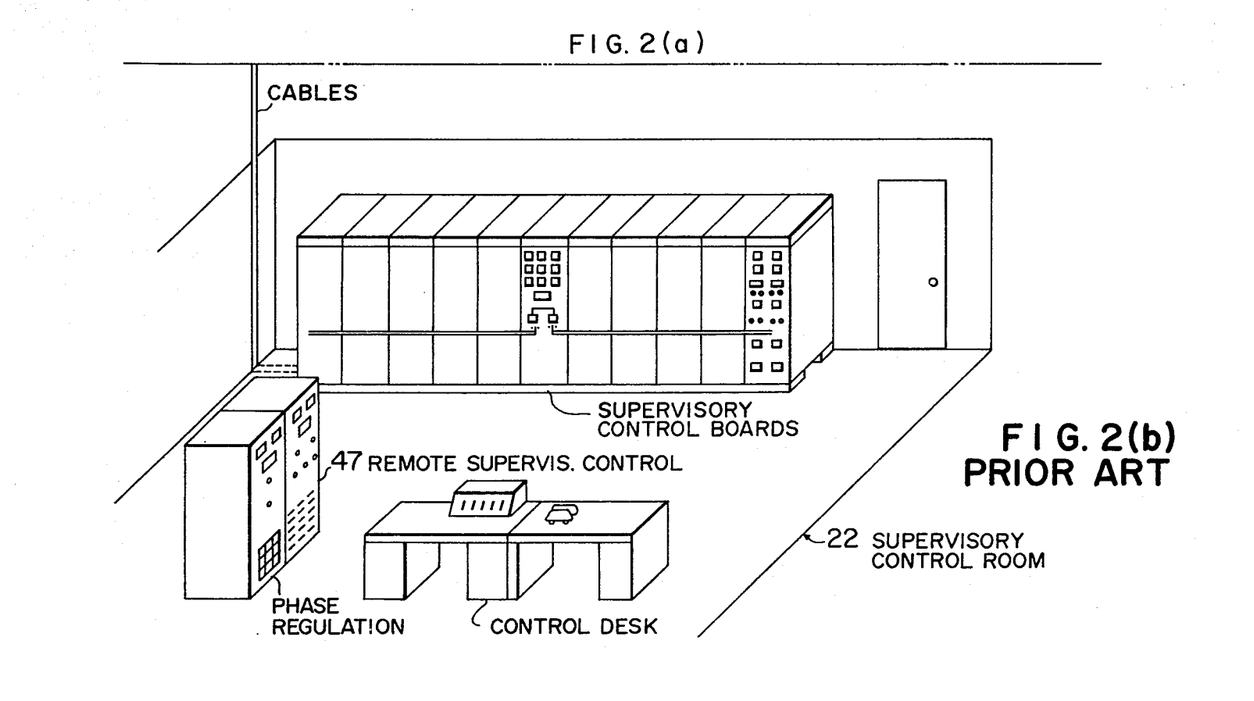

Referring to FIGS. 1 and 2, the conventional system further comprises protection equipment, communication equipment, and the like installed in a relay room 21 of the local electric power house and supervisory control boards placed in a supervisory control room 22 of the house. The signals representative of the instantaneous analog data detected by the detecting devices and of the inherently stationary data representative of the states of the secondary power apparatus of the local house are sent to the relay room 21 through respective cables.

The protection equipment comprises a bus protection device 25 responsive to the bus voltage data, the line current data, and the high voltage side current data for producing a bus protection output and a bus protection data signal, a main transmission line protection device 26 responsive to the line voltage and current data and data supplied thereto in a manner later described from the adjacent electric power house connected to the transmission line LINE for producing a main line protection output and a main line protection data signal, and similar main line protection devices (not shown) for the transmission lines (not shown) branching from the bus bars BUS at the local house. Further included are a transmission line protection backup device 27 responsive to the line voltage and current data for producing a line protection backup output and a line protection backup data signal, a transformer protection device 28 responsive to the bus voltage data and the high and low voltage side current data for producing a transformer protection output and a transformer protection data signal, and an automatic trouble eliminating device 29 responsive to the bus voltage data, the line voltage and current data, the high tension side current data, the inherently stationary data, and various protection data supplied from the protection devices 25 through 28 for producing a trouble elimination output. The protection and the trouble elimination outputs are sent to the secondary power apparatus through cables (not shown) to control the same.

The supervisory control boards comprise a local supervisory control device 30 responsive to the bus voltage data, the line voltage and current data, the high voltage side current data, the inherently stationary data, various protection data, the data supplied thereto from the adjacent electric power houses for producing local state signals indicative of the instantaneous analog data and the inherently stationary data of the bus bars BUS and the power apparatus shown. The local supervisory control devices are in principle in one-to-one correspondence to the transmission lines and the primary power apparatus of the local house. The communication equipment comprises high-speed transmission devices 31, ..., and 34 for transmitting the main line protection data signals between the local and the adjacent houses through a microwave transmitter-receiver 35, and low-speed transmission devices 36, ..., and 39 for transmitting the local state signals between the local and the adjacent houses through the transmitter-receiver 35. A remote supervisory control transmission device 41 is provided for transmitting the local state signals to a remote supervisory control transmission device 45 installed in a center station 46 which comprises similar remote supervisory control transmission devices (not shown) for the other electric power houses of the power system and a remote supervisory control device 47.

Each of the potential devices PD and current transformer CT of the conventional supervisory control system must produce a high-power output because considerable power is consumed by the protection and supervisory control devices including meters and because the output should not be adversely affected by noises while transmitted through the cables. In order to provide a high-power output, each current transformer CT must comprise a core of high magnetic permeability. The core, however, reaches saturation with the primary current exceeding a predetermined value and is subject to the residual magnetism when a large current flowing through the primary winding is turned off in a very short time as is the case in short circuit. The core thus reduces the reliability of the instantaneous current data. Even with an enormous core for reducing the magnetic flux density to avoid saturation, it is difficult in practice to reduce the error for a large current because the current that flow upon occurrence of trouble is greater than the normal current by a factor of several scores.

The cables for the data must be capable of transmitting the high-power outputs. In an electric power house of the 275kV class, the rated current for the secondary winding of each current transformer is 1 ampere instead of the 5 amperes. For an electric house of the 500kV class, each cable must be about twice as long as that for the electric houses of the 275kV class and consequently twice as thick as the latter because a reduction of the rated current below 1 ampere would result in the problem of insulation of the accordingly raised terminal voltage and in the consequent bulk of the detecting devices, cables, and protection and supervisory control devices.

In addition, the excellent performance required of the supervisory control system results in an increase in the number of meters and relays and in the complexity of the data processing. For meters, it is desirable to reduce the error for the instantaneous analog data to a range below the rated value and to provide saturation characteristics for the data of abnormally great values. For a protection relay, it is necessary to reduce the error for the abnormally great values which the data would assume upon occurrence of trouble. It is therefore mandatory to provide a current transformer CT with a plurality of secondary windings for use with various meters and relays. This enhances complexity of the current transformer structure and the number and consequently the bulk of the cables for the data although the reliability is not greatly improved thereby. The increased complexity of the data processing results in an accumulation of errors which occur each time the analog data are processed. This imposes a limitation on the reliability of the supervisory control system.

With a sophisticated supervisory control system covering only a few electric power houses, trouble in the power system often causes serious adverse effects on the power supply. With an improved conventional supervisory control system for a wide area of the power system, the performance is poor because of the differences in errors inevitable in the analog data at different areas of the power system and the resulting large error in the whole wide-area protection system. Furthermore, the analog data can be inconvenient to memorize and can be processed only with hardware. This necessitates provision of specific devices for various functions of the supervisory control system and new design of protection and supervisory control equipment each time new performance is required as a result of, for example, modification of the power system.

Figure 3:
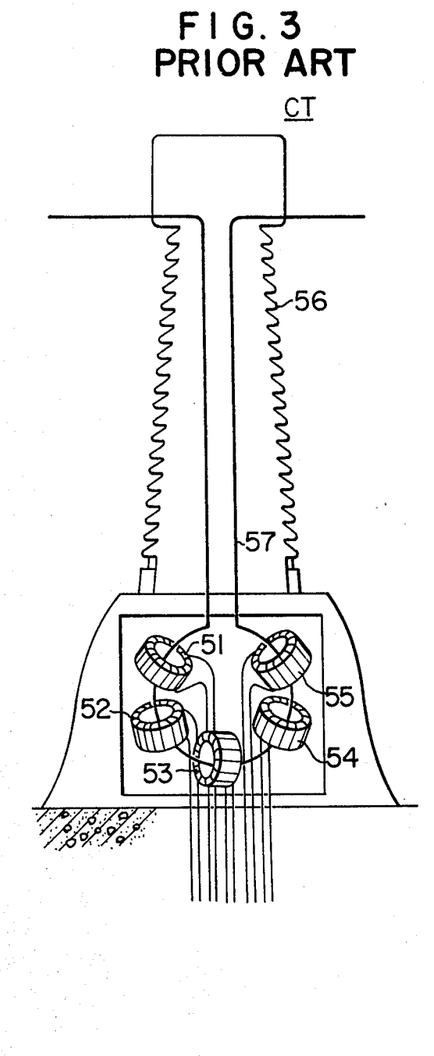
FIG. 3 is a schematic side view of a current transformer used in the conventional system.

Referring to the prior art in FIG. 1 and more particularly to FIG. 3, a current transformer CT used in a conventional supervisory control system comprises a plurality of secondary windings 51, ..., and 55 wound on toroidal cores placed in the base of an upright porcelain insulator 56. The primary winding 57, namely, one of the wires of the transmission line LINE is led through the porcelain insulator 56 and threads through the toroidal cores. The secondary windings 51, ..., and 55 provide in effect a plurality of current transformers. Thus, the first current transformer CT1 for each wire of the transmission line LINE comprises five separate current transformers for the protection and supervisory control devices 25, 26, 27, 29, and 30, respectively, and the second current transformer CT2 for each wire of the main transformer MTr comprises four individual current transformers for the protection and supervisory control devices 25, 28, 29, and 30, respectively. In correspondence to the increased number of the current transformers, it is necessary to use nine and six four-conductor cables for the first and second sets of current transformers CT1 and CT2, respectively.

Figure 4:
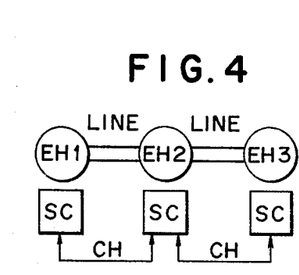
FIG. 4 is a schematic diagram illustrating a first embodiment of this invention.

Referring now to FIG. 4, an electric power system exemplified therein and served by a supervisory control system according to the present invention comprises three electric power houses EH1, EH2, and EH3 and transmission lines LINE interconnecting the electric power houses EH1 through EH3. The supervisory control system comprises supervisory control installation SC in each of the electric power houses EH1 through EH3 and microwave channels CH interconnecting the adjacent supervisory control installation SC.

Referring to FIGS. 5a, 5b and 6–8, one of the supervisory control installation SC illustrated with reference to FIG. 4 comprises a master oscillator or timing pulse operator 60 for generating timing pulses, a first synchronized encoder 61 for the first potential devices PD1.

Figure 5A:
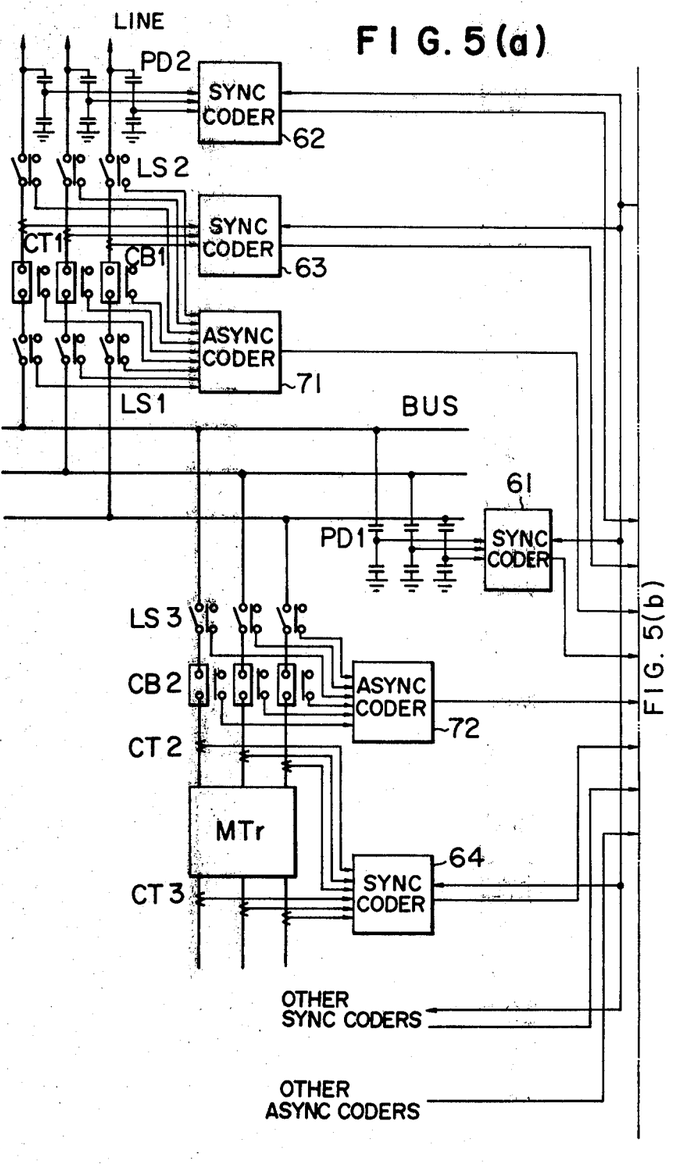
FIGS. 5(a) and (b) schematically show the circuit of a supervisory control installation installed in an electric power house as depicted in FIG. 4, with FIG. 5(b) being located on the right side of FIG. 5(a)
Figure 5B:
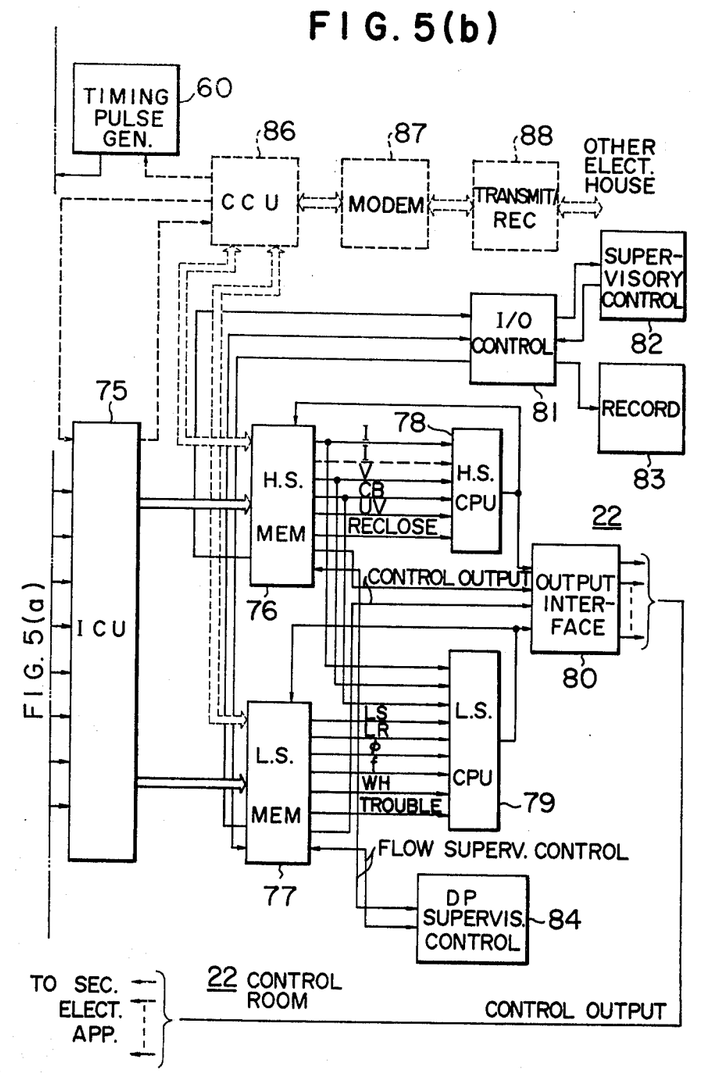

A second synchronized encoder 62 for the second potential devices PD2, a third synchronized encoder 63 for the first current transformers CT1, and a fourth synchronized encoder 64 for the second and third current transformers CT2 and CT3.

Responsive to the timing pulses, the synchronized encoders 61 through 64 simultaneously sample the analog data detected by the associated detecting devices and convert the sampled analog data into digital coded signals. For this purpose, each synchronized encoder exemplified in FIG. 7 comprises a synchronizing circuit 66 for delaying the timing pulses supplied thereto in compliance with the phase lag of the supplied timing pulses.

Figure 8:
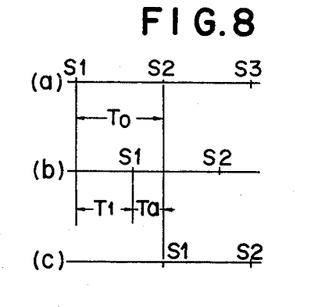
FIG. 8 is a block diagram of a synchronized encoder used in the system according to this invention.

More particularly, the signal representative of the instantaneous analog data should be sampled to enable reproduction of from the tenth to the twentieth higher harmonics of the commercial frequency oscillation. Accordingly, the frequency of the timing pulses may be 1200 Hz. The timing pulses produced by the master oscillator 60 are represented for example, as depicted in FIG. 8 along a horizontal line (a), by S1, S2, ..., having a repetition period $T_0$. The timing pulses reach the encoder with a time lag $T_1$ in the manner illustrated in FIG. 8 along a horizontal line (b). The synchronizing circuit 66 delays the received timing pulses by an amount equal to $T_a = T_0 - T_1$ so that the analog data may be sampled in synchronism with the timing pulses generated at the master oscillator 60 as shown in FIG. 8 along a horizontal line (c). The master oscillator 60 may be incorporated in one of the encoders 61 through 64. Alternatively, the master oscillator 60 may be installed in a remote location, in which case it may be necessary to adjust the delay time $T_n$ to a difference $nT_0 - T_1$ where $n$ represents a positive integer.

Figure 7:
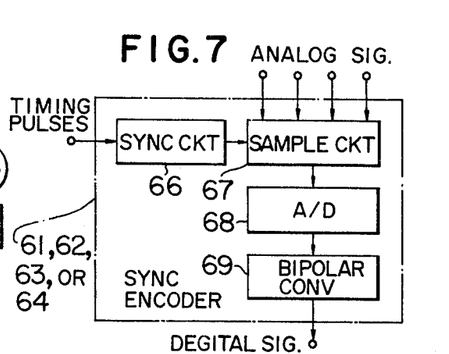
FIG. 7 is a timing chart illustrating timing pulses used in the system according to this invention.

Each encoder further comprises a sampling circuit 67 responsive to the delayed timing pulses for sampling the analog data signal and an analog-to-digital converter 68 for converting the sampled analog signal into a digital coded signal, and may preferably comprise a bipolar converter 69 for converting the digital signal into a bipolar digital coded signal. For a plurality of analog data signals, the sampling circuit 67 should comprise scanning means for scanning the analog data signals so that the encoder may produce a time-division multiplexed digital coded signal.

The supervisory control installation further comprises a first asynchronous encoder 71 for the first and second line switches LS1 and LS2 and the first circuit breakers CB1 and a second asynchronous encoder 72 for the third line switches LS3 and the second circuit breakers CB2 accompanying the main transformer MTr. The states of each secondary power apparatus are detected in a manner known in the art by an auxiliary switch coupled to the main secondary power apparatus and formed into the inherently stationary data signal, which keeps a certain value for at least a period of the order of seconds and consequently may be converted into a digital coded signal without exact synchronization. Each encoder 71 or 72 for the inherently stationary data signals may therefore be dispensed with the synchronizing means illustrated with reference to FIGS. 7 and 8 but may only comprise scanning means, an analog-to-digital converter, and a bipolar converter for converting in combination the inherently stationary data signals into a time-division multiplexed digital coded signal.

Instead of the bulky cables, the time-division multiplexed digital coded signal produced by each of the encoders 61 through 64 and 71 and 72 is sent to the control room 22 through a compact coaxial cable. The stability of the timing pulses is preferably of the order of $10^{-8}$. Instead of the delay means, the synchronizing circuit 66 may comprise a synchronous oscillator controlled by the timing pulses for producing sampling pulses the stability of with a order of $5 \times 10^{-5}$. As will soon become clear, it is possible to substitute only one synchronized encoder for a plurality of the synchronized encoders, such as 61 and 62 or 63 and 64.

Figure 9:
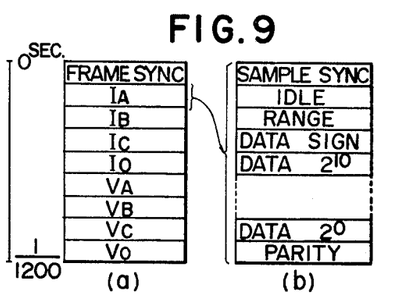
FIG. 9 shows a time-division multiplexed signal used in the system according to this invention.

Referring to FIG. 9, each frame of the time-division multiplexed signal may comprise nine words, each consisting of sixteen bits, for representing two sorts of instantaneous analog data, such as the voltage and current data of the transmission line LINE or the current data on both sides of the main transformer MTr. In the example depicted in FIG. 9(a), the nine words are used for the frame synchronism, the A-phase, B-phase, C-phase, and zero-phase current data, and the A-phase, B-phase, C-phase, and zero-phase voltage data.

As shown in FIG. 9(b), the first bit of each word may be used to represent whether the synchronism of sampling at various points of the power system is maintained or not. When the synchronism goes out of order, the first bit is turned to logic 1 to represent the fact. The second bit is idle. The fifth through fifteenth bits are used to represent the sampled analog data. During normal operation of the power system, the current may be, for example, 4000 amperes. Upon occurrence of trouble, the current increases to as high as 12800 amperes. It is therefore desirable to switch the range from normal to abnormal when the sampled analog data tend to exceed the normal range. The third bit is used to represent the normal and abnormal ranges with logic 0 and 1, respectively. It is possible to produce the third and the fifth through fifteenth bits by the analog-to-digital converter 68 for producing a logic 0 signal at the third bit and the less significant eleven bits of the digital signal at the fifth through fifteenth bits when the more significant four bits are logic 0 codes and for producing a logic 1 signal at the third bit and the more significant eleven bits at the fifth through fifteenth bits when the more significant four bits include at least one logic 1 code.

Alternatively, the analog-to-digital converter 68 may discriminate at first whether the instantaneous analog data is less than $2^{11}$ to produce a logic 0 signal and the less significant eleven bits in the affirmative case and produce a logic 1 signal and the more significant eleven bits when the data is equal to or greater than $2^{11}$. The two examples given above will enable those skilled in the analog and digital conversion art to modify the analog-to-digital converter 68 in other desired ways. The fourth bit is used to represent the sign of the sampled analog data, the positive and negative values being given by logic 0 and 1 codes, respectively. The sixteenth bit is the parity check bit.

Referring back to FIGS. 5a and 5b and 6, the supervisory control installation SC comprises an interconnection control unit 75 responsive to the time-division multiplexed signals supplied thereto from the encoders 61 through 64 and 71 and 72 for carrying out temporary storage of the signals, check of the errors, classification and rearrangement of the data, and the like. The unit 75 may calculate the effective and reactive powers, the electric energy, and like data and calculate, by referring to a standard power source (not shown), the frequency data. The unit 75 temporarily stores the calculated data. The supervisory control installation SC further comprises a high-speed memory 76, a low-speed memory 77, a high-speed data processing unit 78, a low-speed processing unit 79, an output interface 80, an input-output control unit 81, a supervisory control unit 82, a recording unit 83 including a printer and/or a wave form recorder, and a data processing supervisory control unit 84. "High speed" and "low speed" as called herein refer to the rates of variation of the data. Each main memory 76 or 77 may therefore be a known memory device, such as a core memory or an integrated circuit memory. The supervisory control installation SC may still further comprise a communication control unit 86, a modulataor 87, and a microwave transmitter-receiver 88 for transmitting the data between the local electric power house shown and the adjacent electric power houses through the microwave channels CH. It is possible to synchronize, through the microwave link, the timing pulses used in every electric power house of the supervisory control system.

Figure 10:
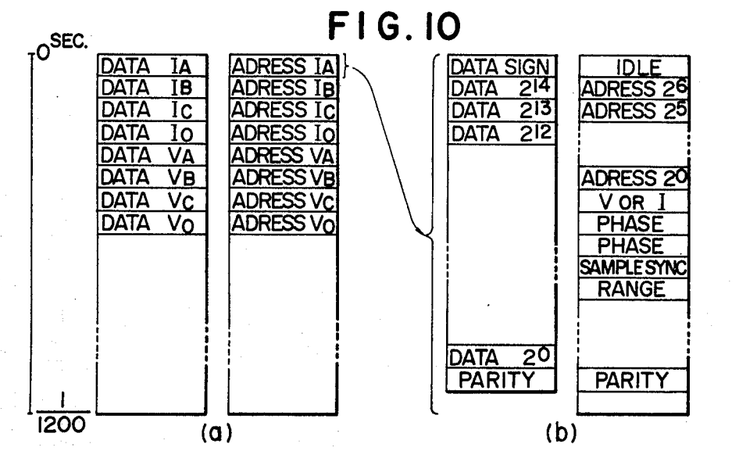
FIG. 10 shows bit-parallel data and address words used in the system according to this invention.

Referring to FIG. 10 and again to FIGS. 5a and 5b, the interconnection control unit 75 may rearrange the time-division multiplexed signals in compliance with the sources of such signals into a pair of bit-parallel word-series digital signals. In one of the series of the signals, eight words for the A-phase, B-phase, C-phase, and zero-phase currents and the A-phase, B-phase, C-phase, and zero-phase voltages may appear about twenty times in a time-division fashion within a frame period of 1/1200 second as shown in FIG. 10(a). In the other, address words for the respective data words appear simultaneously with the corresponding data words. Each word may consist of sixteen bits.

As shown in particular in FIG. 10(b), the first bit of each data word represents the sign. The second through twelfth bits are used to give the data. Alternatively, a data and an address word may consist of different bits, with the corresonding bits produced simultaneously. In this alternative case, the second through sixteenth bits preferably give the data. The absolute value of the data given with only eleven bits plus the range bit in the time-division multiplexed signal is rearranged with reference to the range bit into a digital signal of fifteen bits, which are sufficient to represent the normal and abnormal data on the same quantization levels. The first bit of each address word is idle. The second through eighth bits represent the address of the detecting device. The ninth bit may become logic 1 and 0 according to whether the data is the voltage or the current data, respectively. The tenth and eleventh bits may become 00, 01, 10, and 11 for the A, B, C, and zero phases. The twelfth bit represents the synchronism of sampling given by the first bit of each word of the time-division multiplexed signal. Irrespective of whether the data are given in the data word with 11 or 15 bits, the tenth bit preferably represents the range.

Other bits of the data and address words may be used to represent the result of parity check of the word of the time-division multiplexed signal, the result of three-phase check, namely, whether the sum of the A-phase, B-phase, and C-phase currents plus three times the zero-phase current is zero or not, and the like. Each of the data and address words includes a parity check bit. The data word may be for the calculated power, frequency, and the like. The bit-parallel word series for the instantaneous analog data and for the inherently stationary data are supplied to the high-speed and low-speed main memories 76 and 77. This is carried out by separate paths for the data of both types. Alternatively, the address data words may be used to enable and disable gate means. Similarly, the communication control unit 86 transmits the contents of the memories 76 and 77 between memories 76 and 77 and the corresponding memories of the adjacent houses through the microwave link.

Data, such as the current data, required in carrying out protection of the transmission line LINE may be transmitted between the interconnection control unit 75 and the corresponding units of the adjacent houses also through the microwave link. In this latter case, the address words for the current and the like data sent from adjacent houses may be given by the interconnection control unit 75 of the local house.

Referring still further to FIG. 5b, the main memories 76 and 77 supply the data and address words to the data processing units 78 and 79. This may be carried out in the form of bit-parallel flows of the words. With reference to the address words and the program being executed, each data processing unit 78 or 79 selects the data words useful in executing the program. In FIG. 5b, various data supplied to the data processing units 78 and 79 are illustrated by separate lines for mere convenience of illustration. Thus, the voltage data V, the current data I of the local electric power house, and the state of the circuit breakers CB are used in both data processing units 78 and 79. The current data I of the adjacent electric power houses shown by a dashed line are used in the high-speed data processing unit 78. The states of the line switches LS, the voltage regulators LR, and the phase modifiers $\phi$ and the calculated data of the frequency $f$ and the electric energy WH are used in the low-speed data processing unit 79.

The high-speed data processing unit 78 processes the data in compliance with programs for protection of the bus bar BUS, the transmission line LINE, and the main transformer MTr, back-up protection of the transmission line LINE, detection of the undervoltage state, reclosure of the circuit breakers CB, and the like. The low-speed data processing unit 79 processes the data in accordance with programs for trouble elimination, the local supervisory control, the remote supervisory control, and others.

The programs for protection of the bus bar BUS, transmission line LINE, and the main transformer MTr, and back-up protection of the transmission line LINE may be those used in the conventional bus protection device 25, main transmission line protection device 26, transformer protection device 28, and transmission line back-up protection device 27, respectively. The programs for detection of the undervoltage state, reclosure of the circuit breakers CB, and trouble elimination may be those used in the conventional trouble elimination device 29. The programs for local and remote supervisory control may be those used in the conventional local supervisory control device 30. For better understanding of the programs, a program for protection of a transmission line LINE will later be described in detail. When the data processing means 78 and/or 79 produces a control output indicative of the on-off states of the circuit breakers, adjustment of the voltage regulators, regulation of the phase modifiers, and the like, the control output is sent through the output interface 80 and cables to the pertinent power apparatus to control the same. The result of data processing is sent also to the main memory means 76 and/or 77 to be temporarily stored therein and used in the data processing in the manner shown by separate lines having legends UV for the undervoltage state, "reclose", "trouble", and "control output".

In the manner known in a art, the output control unit 81 surveys the data stored in the main memories 76 and 77 and supplies the pertinent data to the supervisory control unit 82 and/or the recording unit 83. When an operator finds a necessity for manual control upon study of the data displayed by the supervisory control unit 82 and/or the recording unit 83, the operator manually sets the supervisory control unit 82 to effect on-off and/or the adjustment in the known manner through input control unit 81 and others. The data processing supervisory control unit 84 sees the operation of the main memories 76 and 77 and, through the memories 76 and 77, the operation of the data processing units 78 and 79 and the input-output control unit 81.

Figure 11:
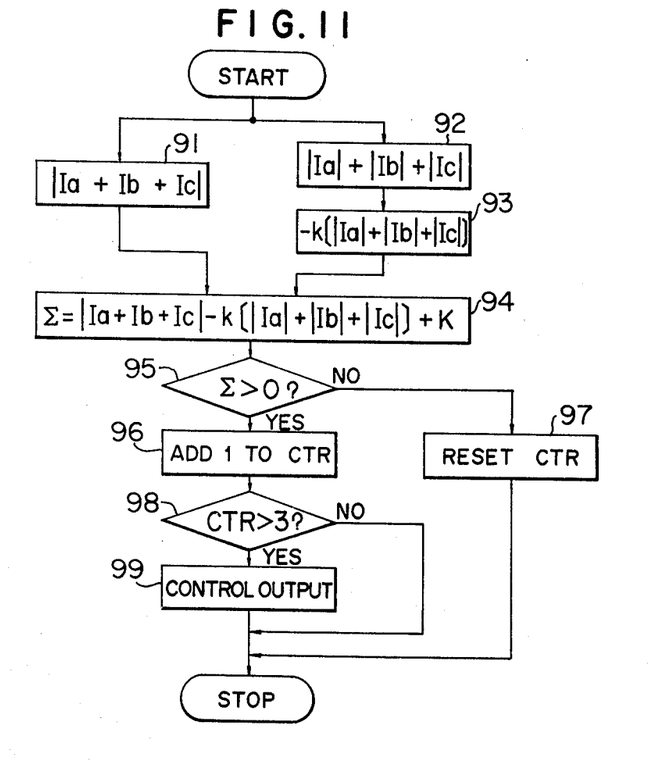
FIG. 11 is a schematic flow chart of a program for execution by a data processing unit used in the system according to this invention.

Referring to FIG. 11 and still further to FIGS. 5a and 5b, protection of the transmission line LINE will be described by way of example of the programs executed by the data processing units 78 and 79. It is recalled here that the current flowing into the transmission line LINE is equal to the current flowing out during normal operation. It is therefore possible to supervise the transmission line LINE by checking whether.

$$|I_a + I_b + I_c| - k[|I_a| + |I_b| + |I_c|] + K > 0$$

holds or not, where the suffixes $a$, $b$, and $c$ represent three points of the power system, $k$ is a factor for correcting the output-versus-current characteristics of the current transformers concerned, and K is a constant predetermined in consideration of the full scale error.

In order to calculate the first term of the left side, the high-speed data processing unit 78 picks up a set of current data $I_a$, $I_b$, and $I_c$ with respect to the address words, calculates the sum, and changes the sign bit of the sum, if such is a logic 1 code, into a logic 0 code, as shown at 91. The unit 78 similarly changes the sign bits of the respective current data $I_a$, $I_b$, and $I_c$ to logic 0 codes and calculates the sum of the absolute values at 92. The unit 78 multiplies the sum of the absolute values by the factor $k$ and changes the sign bit of the product to a logic 1 code at 93. The unit 78 calculates the sum of the first-mentioned sum, the sign-changed product, and the constant K at 94. The unit 78 checks at 95 if the last-mentioned sum is greater than zero or not.

When the sum is greater than zero to point out the presence of an anomaly in the transmission line LINE, one is put in a counter at 96. The process is repeated as long as the last-mentioned sum is greater than zero to add one to the content of the counter at 96. When the sum derived at 94 is not greater than zero, the counter is reset at 97. Thus, the content of the counter represents the duration of the anomaly in terms of the sampling periods. The unit 78 checks at 98 whether the content of the counter is greater than three. In the affirmative case, the unit 78 produces a control output at 99, which is a transmission line protection output sent through the output interface 80 to the circuit breakers concerned to cut off the same. When the control output is produced at 99, the counter is reset at 97, or the unit 78 finds at 98 the content of the counter to be equal to three or less, the program comes to an end. In overhead wires, most of the anomalies disappear in a fraction of a second. The unit 78 therefore executes the circuit breaker reclosure program following production of the transmission line protection output to restore closure of the related circuit breakers a predetermined time, such as from 0.4 second to 0.8 second, after cut off thereof. It may be mentioned here that the unit 78 may process the data even when the results given by the pertinent bits of the parity check, the three-phase check, and/or the like are unfavorable. In any event, the bits representative of the favorable and the unfavorable results are retained throughout the subsequent supervisory control processes to notify that the displays and/or the records should be understood with pertinent weight.

Figure 12:
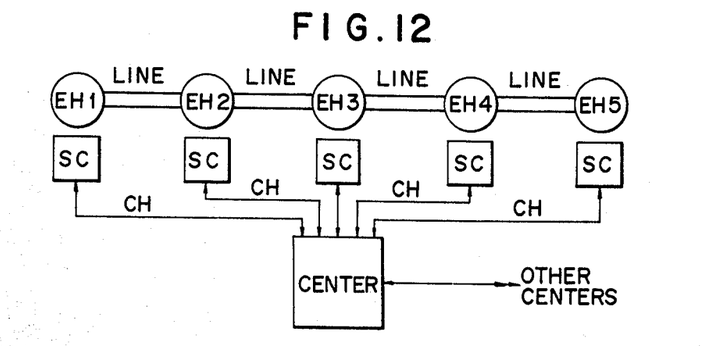
FIG. 12 is a schematic diagram illustrating a second embodiment of this invention.

Referring now to FIG. 12, another embodiment of this invention is for use with an electric system comprising five electric power houses EH1, EH2, EH3, EH4, and EH5 and transmission lines LINE interconnecting the houses and comprises supervisory control installation SC in each house, a center station CENTER, and microwave channels CH interconnecting the installation SC, the center CENTER, and the like center or centers (not shown). The supervisory control installation SC may be substantially identical to that illustrated hereinabove.

Figure 13:
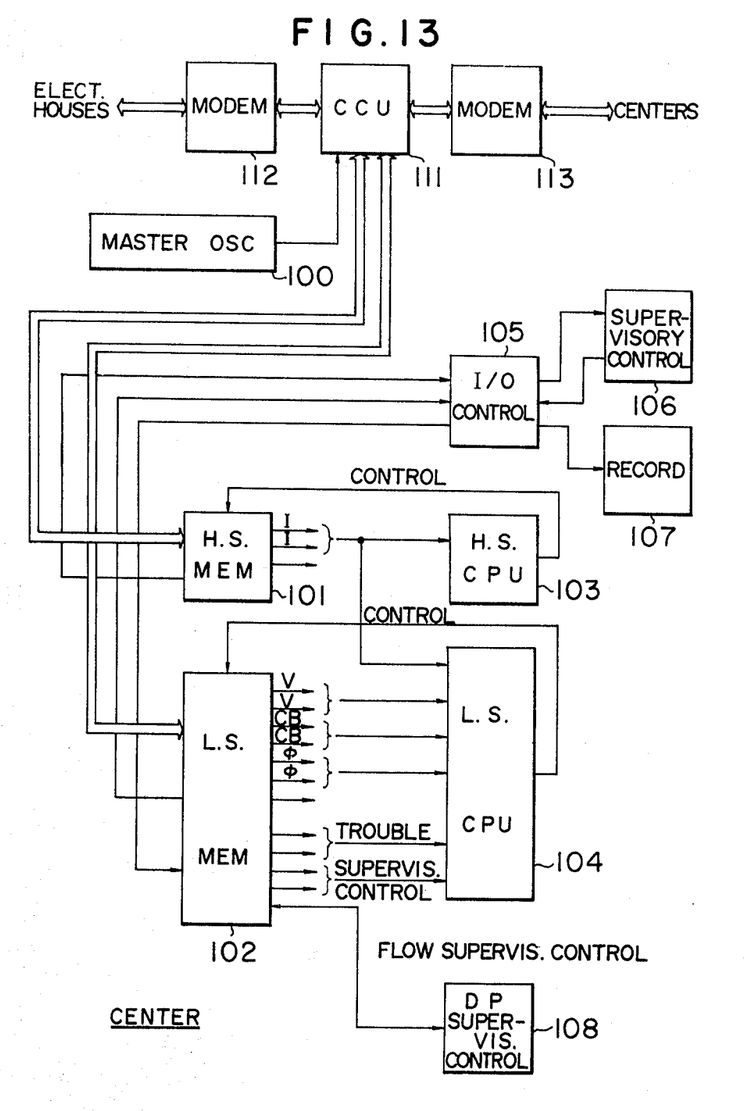
FIG. 13 is a block diagram of a center station used in the second embodiment of this invention.

Referring to FIG. 13, the center station CENTER comprises a master timing pulse generator 100, a high-speed main memory 101, a low-speed main memory 102, a high-speed data processing unit 103, a low-speed data processing unit 104, an input-output control unit 105, a supervisory control unit 106, a recording unit 107, a data processing supervisory control unit 108, a communication control unit 111, modulator-demodulators 112, 113, ..., and a common microwave transmitter-receiver (not shown), all similar to the corresponding units described above. The communication control unit 111 serves to transmit the voltage and current data and the processed data from the electric power houses to the main memories 101 and 102 through the pertinent one of the modulator-demodulators 112, 113, ..., to transmit the current and the like data from each electric power house to the adjacent electric power houses, and to transmit between center stations the timing data and the processed data. The programs for deriving the control outputs should be such as to minimize the area where the power supply is suspended. The control output produced by the data processing unit 103 or 104 is sent to the concerned electric power houses through the main memory 101 or 102, the communication control unit 111, and the pertinent one of the modulator-demodulators 112, 113, ... . The manual control for the electric power houses is carried out at the supervisory control unit 106 of the center station shown through the input-output control unit 105, the low-speed main memory 102, the communication control unit 111, and the relevant one of the modulator-demodulators 112, 113, ..... The data sent to the supervisory control unit 106 and/or the recording unit 107 are also sent to the corresponding units in the electric power houses.

Figure 14:
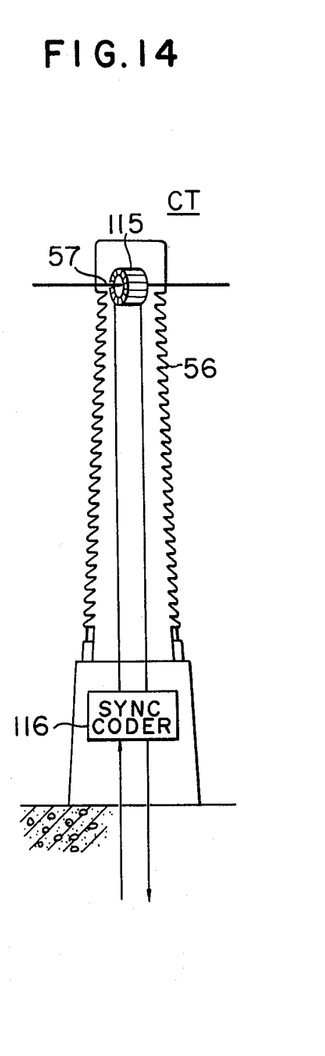
FIG. 14 is a schematic side view of a current transformer used in the system according to this invention.

Referring finally to FIG. 14, a current transformer CT to be used in a supervisory control system according to this invention may be of the porcelain-clad type and comprises an upright porcelain insulator 56 for each wire of the transmission line LINE, a single secondary winding 115 placed at the top of the porcelain insulator 56, and a synchronized encoder 116 placed at the bottom of the porcelain insulator 56. The primary winding 57 may be a mere portion of the straight wire passing through the secondary winding 115. Unlike the conventional ones, the current transformer CT does not comprise a core of magnetic material.

Due to the synchronized encoders, each placed adjacent at least one of the detecting devices for the instantaneous analog data of the electric power system, it is possible in accordance with this invention to resort to only weak analog signals for various supervisory control purposes. This makes it possible to use a current transformer of the structure illustrated with reference to FIG. 14 and a small potential device and reduces the number of the current transformers and the number and the bulk of the cables for the current data.

By way of example, the total copper necessary for the cables for the data weighs only 0.4 ton for a supervisory control installation according to this invention in a typical substation comprising 12 transmission lines and eight transformers in contrast to about 16 tons required for a conventional supervisory control installation in a substation of the same scale. This further means that installation of a supervisory control installation is accordingly simplified. The current transformer makes it unnecessary to take the error in the transformation ratio into consideration because of the absence of iron cores, thereby raising the reliability of the supervisory control system with much simple construction, and renders the transmission line short because of disposition of the secondary winding at the top of the porcelain-clad current transformer. In addition, use of the digital coded signals representative of the instantaneous analog data makes it possible to realize a reliable supervisory control system of high performance because of the feasibility of shaping of the signals which are subject to distortion effected by inevitable noises.

Figure 6:
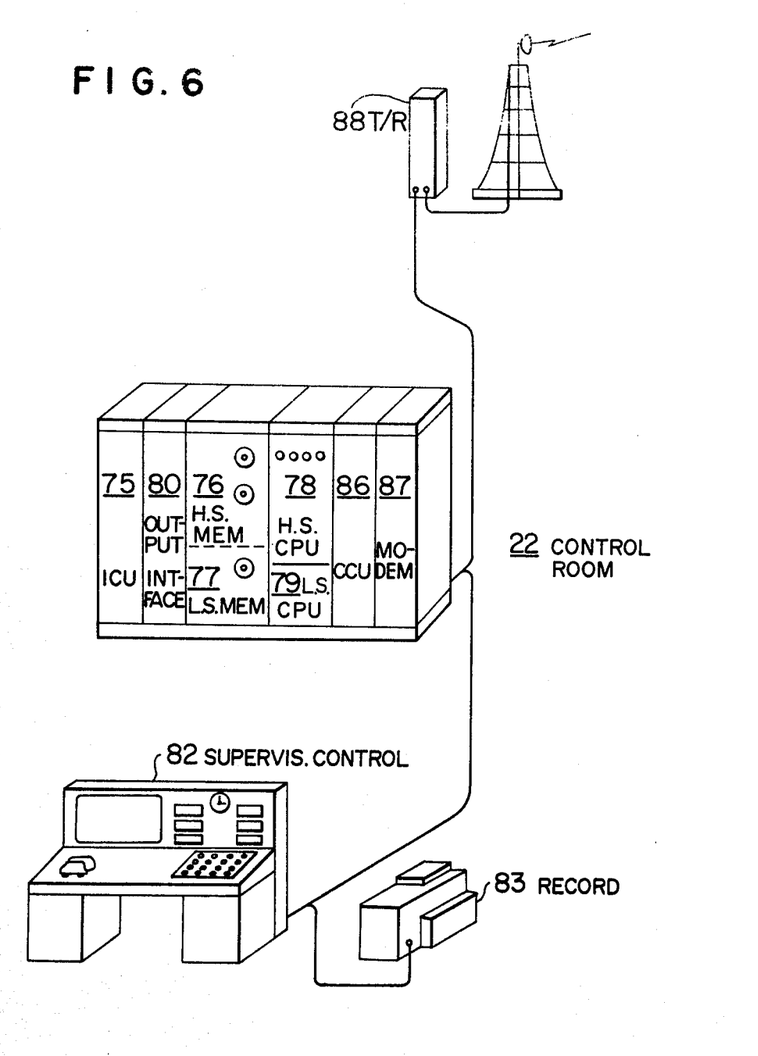
FIG. 6 is a schematic perspective view of the supervisory control installation depicted in FIGS. 5(a) and (b)

The supervisory control system is operable at a high speed because it is easy to detect and even correct the errors in a short period of time and it is rendered unnecessary to survey the data for a considerable duration of time on detecting an error. Synchronization enables the data processing to be much more simplified and the units therefor to be minimized because complicated data processing is otherwise unnecessary. Combination of the digital data processing units with the synchronized encoders enables each data processing unit to be used in various ways by the programs. This enhances the reliability, the versatility, and economy of the supervisory control system. Supervisory control installation for the typical substation exemplified above comprises only ten or so bays according to this invention, whereas a conventional one for a similar substation comprises as much as about one hundred bays. FIGS. 2 and 6 illustrate this fact.

While a few embodiments of this invention and modifications thereof have thus far been described, it should be noted that further modification is possible. For example, the sampling pulses may not appear simultaneously with the respective timing pulses as produced by the master oscillator but may appear in predetermined phase relation to the timing pulses. The digital coded signals may be written in the main memories and read out thereof without resorting to the bit-parallel address words. The asynchronous encoder as called herein should be understood as comprising no means for sampling the inherently stationary data in predetermined relation to the timing pulses as produced.

What is claimed is:

1. A supervisory control system for supervising and controlling an electric power system by the use of digital signals representative of instantaneous analog data of first preselected points of the power system and inherently stationary data of second preselected points of the power system, said control system comprising:

first detecting devices coupled to said power system at said first preselected points for detecting said instantaneous analog data to produce instantaneous analog signals representative of said instantaneous analog data;

second detecting devices coupled to said power system at said second preselected points for detecting said inherently stationary data to produce inherently stationary signals representative of said inherently stationary data;

a master oscillator for producing timing pulses;

synchronized encoders, each placed adjacent to at least one of said first detecting devices and electrically associated therewith and with said master oscillator, said synchronized encoders substantially simultaneously sampling in response to said timing pulses the instantaneous analog signals produced by the associated first detecting devices to produce instantaneous digital signals representative of the instantaneous analog data detected by the last-mentioned first detecting devices; and asynchronous encoders, each placed adjacent to at least one of said second detecting devices and electrically associated therewith, said asynchronous encoders sampling the inherently stationary signals produced by the associated second detecting devices to produce sampled inherently stationary signals representative of the inherently stationary data detected by the last-mentioned second detecting devices;

said instantaneous digital signals and the sampled inherently stationary signals being used as the first-mentioned digital signals.

2. A supervisory control system as claimed in claim 1, wherein each of said synchronized encoders comprises a synchronizing circuit connected to said master oscillator for receiving the timing pulses and for delaying the received timing pulses in compliance with that phase lag of the received timing pulses which is dependent on the distance between said each synchronized encoder and said master oscillator, said synchronizing circuit thereby producing sampling pulses, and means responsive to said sampling pulses for sampling the data signals produced by at least one of the first detecting devices electrically associated with said each synchronized encoder.

3. A supervisory control system as claimed in claim 1, wherein said electric power system comprises a transmission line, said first detecting devices comprising a current transformer of a porcelain-clad type coupled to each wire of said transmission line at one of said first preselected points producing data signals representative of instantaneous electric current of said each wire at said one first preselected point, said current transformer comprising only one secondary winding at its top and one of said synchronized encoders at its bottom, said each wire passing through said secondary winding without being looped and serving as a sole primary winding for said secondary winding, said secondary winding having no core of magnetic material and producing the data signals representative of said instantaneous electric circuit, one said synchronized encoder being electrically connected to said secondary winding within said current transformer and to said master oscillator and capable of producing, in response to said timing pulses, instantaneous digital signals representative of said instantaneous electric current.

* * * * *